: US011470024B2

(12) United States Patent
Lee et al.

(10) Patent No.: US 11,470,024 B2
(45) Date of Patent: Oct. 11, 2022

(54) METHOD, SYSTEM, AND NON-TRANSITORY COMPUTER READABLE RECORD MEDIUM FOR PROVIDING REMINDER MESSAGES

(71) Applicant: LINE Plus Corporation, Seongnam-si (KR)

(72) Inventors: Seung Won Lee, Seongnam-si (KR); Jihun Im, Seongnam-si (KR); Hyojin Lim, Seongnam-si (KR); Jun Hyuk Park, Seongnam-si (KR)

(73) Assignee: LINE Plus Corporation, Seongnam-si (KR)

( * ) Notice: Subject to any disclaimer, the term of this patent is extended or adjusted under 35 U.S.C. 154(b) by 254 days.

(21) Appl. No.: 16/855,405

(22) Filed: Apr. 22, 2020

(65) Prior Publication Data

US 2020/0336444 A1 Oct. 22, 2020

(30) Foreign Application Priority Data

Apr. 22, 2019 (KR) .......................... 10-2019-0046552

(51) Int. Cl.
*G06F 15/16* (2006.01)
*H04L 51/046* (2022.01)
*G08B 21/24* (2006.01)

(52) U.S. Cl.
CPC ............ *H04L 51/046* (2013.01); *G08B 21/24* (2013.01)

(58) Field of Classification Search
USPC ......................................................... 709/206
See application file for complete search history.

(56) References Cited

U.S. PATENT DOCUMENTS

| 7,895,277 | B2 * | 2/2011 | Drory | H04L 51/234 709/224 |
| 8,972,494 | B2 * | 3/2015 | Chen | H04L 51/04 709/204 |
| 2003/0011646 | A1 * | 1/2003 | Levine | G16H 40/20 715/848 |
| 2007/0174404 | A1 * | 7/2007 | Hui | G06Q 10/109 709/207 |
| 2007/0283403 | A1 * | 12/2007 | Eklund, II | H04N 21/4788 725/117 |
| 2009/0172104 | A1 * | 7/2009 | Jones | H04L 51/04 709/206 |
| 2010/0167712 | A1 * | 7/2010 | Stallings | G06F 3/04883 455/418 |
| 2015/0121216 | A1 * | 4/2015 | Brown | G06N 3/008 715/705 |
| 2016/0224939 | A1 * | 8/2016 | Chen | G06Q 10/06311 |
| 2016/0239165 | A1 * | 8/2016 | Chen | H04L 51/52 |
| 2016/0246806 | A1 * | 8/2016 | Bastide | G06F 40/166 |

(Continued)

FOREIGN PATENT DOCUMENTS

KR 10-2002-0074304 A 9/2002

*Primary Examiner* — Anthony Mejia
(74) *Attorney, Agent, or Firm* — Sughrue Mion, PLLC

(57) ABSTRACT

A method, a system, and a non-transitory computer readable record medium for providing a reminder message are provided. A reminder providing method may include recognizing a reminder request message among one or more messages exchanged through a chatroom; creating a reminder message based on the reminder request message; and sending the reminder message in the chatroom at a time preset for the reminder request message.

20 Claims, 12 Drawing Sheets

(56) References Cited

U.S. PATENT DOCUMENTS

| | | | |
|---|---|---|---|
| 2017/0257338 A1* | 9/2017 | Zhang | H04L 51/10 |
| 2017/0339119 A1* | 11/2017 | Li | H04L 51/00 |
| 2017/0346777 A1* | 11/2017 | Kim | H04L 51/04 |
| 2018/0067914 A1* | 3/2018 | Chen | G06Q 10/063116 |
| 2018/0095940 A1* | 4/2018 | Meixner | H04L 51/046 |
| 2018/0097753 A1* | 4/2018 | Gill | H04L 51/02 |
| 2018/0097902 A1* | 4/2018 | Meixner | G06F 3/0481 |
| 2018/0130334 A1* | 5/2018 | Choi | G08B 21/24 |
| 2018/0199156 A1* | 7/2018 | Gandhi | H04W 4/06 |
| 2018/0204183 A1* | 7/2018 | Choi | G06Q 10/103 |
| 2018/0341387 A1* | 11/2018 | Segal | G06F 3/04817 |
| 2019/0007545 A1* | 1/2019 | Singh | H04L 67/55 |
| 2019/0034059 A1* | 1/2019 | Brummer | H04L 51/046 |
| 2019/0348174 A1* | 11/2019 | Spirer | G06Q 30/018 |
| 2020/0059444 A1* | 2/2020 | Liu | H04L 51/046 |
| 2020/0111060 A1* | 4/2020 | Yang | G06Q 10/1095 |
| 2021/0390144 A1* | 12/2021 | B M S | G06N 3/0445 |

* cited by examiner

METHOD, SYSTEM, AND NON-TRANSITORY COMPUTER READABLE RECORD MEDIUM FOR PROVIDING REMINDER MESSAGES

CROSS-REFERENCE TO RELATED APPLICATION

This application claims priority from Korean Patent Application No. 10-2019-0046552, filed Apr. 22, 2019 in the Korean Intellectual Property Office, the disclosure of which is incorporated herein by reference in its entirety.

BACKGROUND

1. Field

Apparatuses and methods consistent with example embodiments relate to managing messages that are transmitted through telephone, Internet, or mobile device systems.

2. Description of Related Art

An instant messenger is a general communication tool using software capable of sending and receiving messages or data in real time. A user may register his or her contacts in a contact list on a messenger and may exchange messages with a counterpart included in the contact list in real time.

Such a messenger function is popular in a mobile environment of a mobile communication terminal as well as a personal computer (PC).

For example, a mobile messenger service system and method of a portable terminal using a wireless communication network may provide a messenger service between mobile messengers installed on portable terminals.

With the increasing popularity of an instant messenger and diversity of functions provided through the instant messenger, functions of sharing a variety of information and contents, such as photos, videos, files, contacts, locations, schedules, notifications, votes, etc., and interaction with other services, such as a game service or a video service, are supported.

SUMMARY

One or more example embodiments provide a method and an apparatus for creating a reminder message based on a message input to a chatroom and sending the reminder message in the chatroom at a preset time.

According to an aspect of an example embodiment, there is provided a reminder providing method implemented by a computer system comprising at least one processor configured to execute computer-readable instructions included in at least one memory, the reminder providing method including: recognizing a reminder request message among one or more messages exchanged through a chatroom; creating a reminder message based on the reminder request message; and sending the reminder message in the chatroom at a time preset for the reminder request message.

The recognizing may include recognizing the reminder request message based on an occurrence of a preset event at a time of an input of the reminder request message.

The recognizing may include recognizing the reminder request message based on a preset keyword being included in the reminder request message.

The recognizing may include recognizing the reminder request message based on at least one of a time and a place being included in the reminder request message.

The recognizing may include grouping a plurality of messages consecutively input into the chatroom, among the one or more messages exchanged through the chatroom and recognizing the grouped plurality of messages as the reminder request message.

The recognizing may include: processing the reminder request message based on a reminder message type of the reminder request message; and displaying the reminder message to be distinguished from other messages of different message types from the message type of the reminder request message, in the chatroom.

The reminder providing method may further include: providing a reminder management screen to allow a user to confirm the recognized reminder request message as a message to be reminded to a counterpart of the user.

The reminder management screen may include at least one of a list of messages recognized as the reminder request message, a menu for setting or modifying a reminder time for each of the reminder request messages included in the list of messages, and a menu for deleting at least one of the reminder request messages included in the list of message.

The creating may include creating the reminder message by processing at least a portion of the reminder request message.

The creating may include creating the reminder message by deleting or modifying at least a portion of a time-related keyword in the reminder request message.

The creating may include creating a checklist using a check item included in the reminder request message by analyzing the reminder request message, and the sending may include providing the checklist and the reminder message through the chatroom.

The creating may include creating map information associated with a place based on a keyword representing the place being included in the reminder request message, and the sending may include providing the map information and the reminder message through the chatroom.

The sending may include sending the reminder message in the chatroom at a time set as a default time or a time customized by a user based on time information included in the reminder request message.

The sending may include determining a point in time at which the reminder message is to be sent based on an estimated time to reach a place based on information about the place being included in the reminder request message.

The reminder providing method may further include: displaying the reminder message to be distinguished from other messages in the chatroom.

The sending may include outputting a notification indicating that the reminder message is received based on a notification setting of the chatroom.

The sending may include outputting a notification indicating that the reminder message is received regardless of a notification setting of the chatroom.

The reminder providing method may further include: provide a share function for at least one piece of content created within a predetermined period of time when the predetermined period of time is elapsed since the reminder request message is sent.

According to an aspect of another example embodiment, there is provided a non-transitory computer-readable record medium storing computer instructions that, when executed by the at least one processor, cause the at least one processor to perform the reminder providing method According to an aspect of another example embodiment, there is provided a computer system including: at least one memory configured to store computer-readable instructions; and at least one processor configured to execute the computer-readable instructions to: recognize a reminder request message among one or more messages exchanged through a chatroom; create a reminder message based on the reminder request message; and send the reminder message in the chatroom at a time preset for the reminder request message.

BRIEF DESCRIPTION OF THE DRAWINGS

The above and/or other aspects will be more apparent by describing certain example embodiments, with reference to the accompanying drawings, in which.

DETAILED DESCRIPTION

Figure 1:
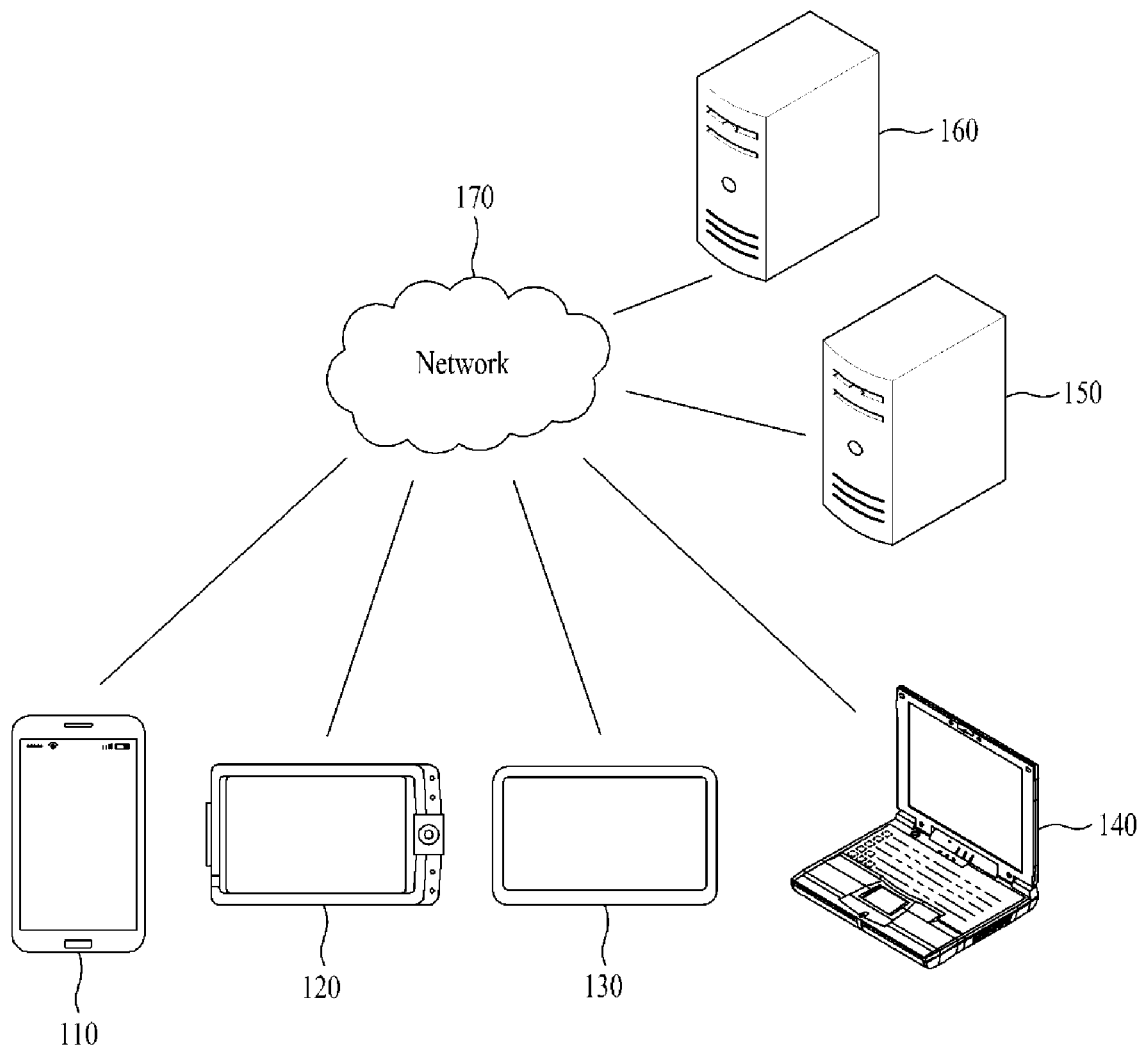
FIG. 1 is a diagram illustrating an example of a network environment according to at least one example embodiment.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware and/or a combination of hardware and software. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor), Central Processing Unit (CPU), a controller, an arithmetic logic unit (ALU), a digital signal processor, a microcomputer, a microprocessor, etc., the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer record medium or device, capable of providing instructions or data to, or being interpreted by, a hardware device. The software also may be distributed over network coupled computer systems so that the software is stored and executed in a distributed fashion. In particular, for example, software and data may be stored by one or more computer readable record mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive, solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable record medium into the one or more storage devices and/or one or more computer processing devices using a drive mechanism. Such separate computer readable record medium may include a Universal Serial Bus (USB) flash drive, a memory stick, a Blue-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable record medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments are described with reference to the accompanying drawings. It should be noted that these drawings are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

The example embodiments relate to technology for managing instant messages, text messages, multimedia messages, and other various types of messages.

One or more example embodiments provide a method and an apparatus for creating a reminder message based on a message input to a chatroom and sending the reminder message in the corresponding chatroom at a preset time, to effectively provide a reminder function in a form of sending the message again in the chatroom without using a specific bot or a separate application (app).

FIG. 1 illustrates an example of a network environment according to at least one example embodiment. Referring to FIG. 1, the network environment may include a plurality of electronic devices 110, 120, 130, and 140, a plurality of servers 150 and 160, and a network 170. FIG. 1 is provided as an example only. A number of electronic devices or a number of servers is not limited thereto.

Each of the plurality of electronic devices 110, 120, 130, and 140 may be a stationary terminal or a mobile terminal that is configured as a computer system. For example, the plurality of electronic devices 110, 120, 130, and 140 may be a smartphone, a mobile phone, a navigation device, a computer, a laptop computer, a digital broadcasting terminal, a personal digital assistant (PDA), a portable multimedia player (PMP), a tablet PC, a game console, a wearable device, an Internet of things (IoT) device, a virtual reality (VR) device, an augmented reality (AR) device, and the like. For example, although FIG. 1 illustrates a shape of a smartphone as an example of the electronic device 110, the electronic device 110 used herein may refer to one of various types of physical computer systems capable of communicating with other electronic devices 120, 130, and 140, and/or the servers 150 and 160 over the network 170 in a wireless or wired communication manner.

The communication scheme is not limited and may include a near field wireless communication scheme between devices as well as a communication scheme using a communication network (e.g., a mobile communication network, wired Internet, wireless Internet, a broadcasting network, a satellite network, etc.) includable in the network 170. For example, the network 170 may include at least one of network topologies that include a personal area network (PAN), a local area network (LAN), a campus area network (CAN), a metropolitan area network (MAN), a wide area network (WAN), a broadband network (BBN), and Internet. Also, the network 170 may include at least one of network topologies that include a bus network, a star network, a ring network, a mesh network, a star-bus network, a tree or hierarchical network, and the like. However, they are provided as examples only.

Each of the servers 150 and 160 may be configured as a computer apparatus or a plurality of computer apparatuses that store and execute an instruction, a code, a file, content, a service, etc., through communication with the plurality of electronic devices 110, 120, 130, and 140 over the network 170. For example, the server 150 may be a system that provides a first service to the plurality of electronic devices 110, 120, 130, and 140 connected over the network 170. The server 160 may be a system that provides a second service to the plurality of electronic devices 110, 120, 130, and 140 connected over the network 170. In detail, the server 150 may provide, as the first service, a service (e.g., a messaging service, etc.) intended by an application through the application as a computer program installed and executed on the plurality of electronic devices 110, 120, 130, and 140. As another example, the server 160 may provide, as the second service, a service that distributes a file for installing and executing the application to the plurality of electronic devices 110, 120, 130, and 140.

Figure 2:
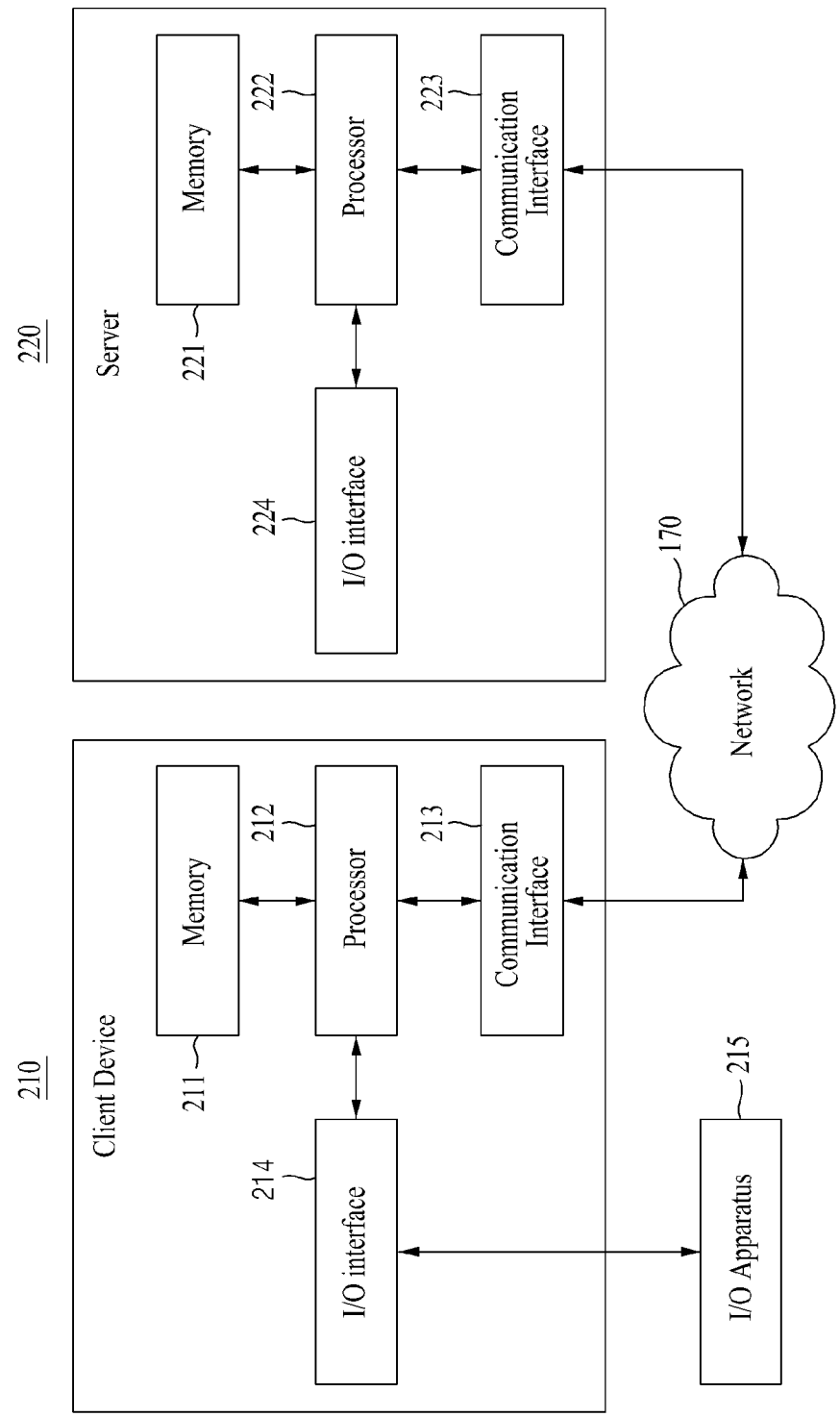
FIG. 2 is a diagram illustrating an example of an electronic device and a server according to at least one example embodiment.

FIG. 2 is a block diagram illustrating an example of an electronic device (a client device) and a server according to at least one example embodiment. A system according to an example embodiment may include a client device 210 and a server 220. The client device 210 may correspond to any of the electronic devices 110, 120, 130, and 140 in FIG. 1. The server 220 may correspond to any of the servers 150 and 160.

Referring to FIG. 2, the client device 210 may include a memory 211, a processor 212, a communication interface 213, and an input/output (I/O) interface 214, and the server 220 may include a memory 221, a processor 222, a communication interface 223, and an I/O interface 224. The memory 211, 221 may include a permanent mass storage device, such as random access memory (RAM), a read only memory (ROM), a disk drive, a solid state drive (SSD), a flash memory, etc., as a non-transitory computer-readable record medium. The permanent mass storage device, such as ROM, SSD, flash memory, and disk drive, may be included in the client device 210 or the server 220 as a permanent storage device separate from the memory 211, 221. Also, an OS or at least one program code, for example, a code for a browser installed and executed on the client device 210 or an application installed and executed on the client device 210 to provide a specific service, may be stored in the memory 211, 221. Such software components may be loaded from another non-transitory computer-readable record medium separate from the memory 211, 221. The other non-transitory computer-readable record medium may include a non-transitory computer-readable record medium, for example, a floppy drive, a disk, a tape, a DVD/CD-ROM drive, a memory card, etc. According to other example embodiments, software components may be loaded to the memory 211, 221 through the communication interface 213, 223, instead of the non-transitory computer-readable record medium. For example, at least one program may be loaded to the memory 211, 221 based on a computer program, for example, the application, installed by files provided over the network 170 from developers or a file distribution system, for example, the server 160, providing an installation file of the application.

The processor 212, 222 may be configured to process instructions of a computer program by performing basic arithmetic operations, logic operations, and I/O operations. The computer-readable instructions may be provided from the memory 211, 221 or the communication interface 213, 223 to the processor 212, 222. For example, the processor 212, 222 may be configured to execute received instructions in response to the program code stored in the storage device, such as the memory 211, 221.

The communication interface 213, 223 may provide a function for communication between the client device 210 and the server 220 over the network 170 and may provide a function for communication between the client device 210 and/or the server 220 with another electronic device, for example, the electronic device 120 or another server, for example, the server 160. For example, the processor 212 of the client device 210 may control the communication interface 213 to transfer a request created based on a program code stored in the storage device such as the memory 211, to the server 220 over the network 170. Also, the processor 212 of the client device 210 may control the communication interface 213 to receive a control signal, an instruction, content, and/or a file via the network 170. Upon receipt, the communication interface 213 may transfer a control signal, an instruction, content, and/or a file to the processor 212 or the memory 211. The processor 212 may control to store the signal, instruction, data, content, and/or file in a storage medium, for example, the permanent storage device, further includable in the client device 210.

The I/O interface 214 may be a device used for interface with an I/O apparatus 215. The I/O apparatus 215 may include an input device and/or an output device. Examples of the input device may include a keyboard, a mouse, a microphone, a camera, etc., and examples of the output device may include a display, a speaker, a haptic feedback device, etc. The I/O interface 214 may be implemented as a device driver software (e.g., a keyboard driver software, a camera driver software, etc.) that is stored in the memory 211 and executed by the processor 212 to control the I/O apparatus 215. As another example, the I/O interface 214 may be a device for interface with an apparatus in which an input function and an output function are integrated into a single function, such as a touchscreen. The I/O apparatus 215 may be integrated into the client device 210. Also, the I/O interface 224 of the server 220 may be a device for interface with an apparatus for input or output that may be connected to the server 220 or included in the server 220. In detail, when the processor 212 of the client device 210 processes an instruction of a computer program loaded to the memory 211, content or a service screen configured based on data provided from the server 220 or the electronic device 120 may be displayed on the display through the I/O interface 214.

According to other example embodiments, the client device 210 and the server 220 may include a smaller or greater number of components than a number of components shown in FIG. 2. However, there is no need to clearly illustrate many components according to the related art. For example, the client device 210 may include at least a portion of the I/O apparatus 215, or may further include other components, for example, a transceiver, a global positioning system (GPS) module, a camera, a variety of sensors, a database (DB), and the like. In detail, if the client device 210 is a smartphone, the client device 210 may be configured to further include a variety of components, for example, an acceleration sensor, a gyro sensor, a camera module, various physical buttons, a button using a touch panel, an I/O port, a vibrator for vibration, etc., which are generally included in the smartphone.

Hereinafter, a method and system for providing reminder messages according to example embodiments is described.

The term "chatroom" used herein may refer to an interface screen for providing messages exchanged between users. For example, an interface screen for displaying messages exchanged through a communication session established between accounts of users in a messenger or a social network service (SNS), an interface screen for displaying messages exchanged with a counterpart of a corresponding telephone number based on the telephone number using a text function such as a short message service (SMS) or a multimedia message service (MMS) may correspond to a representative example of the chatroom.

Although the following description is made based on an example of a chatroom of a messenger, it is provided as an example only. Any type of conversation-based interfaces of a service that allows a plurality of users to join and a new user to frequently join based on an account or a telephone number of a user may apply.

Figure 3:
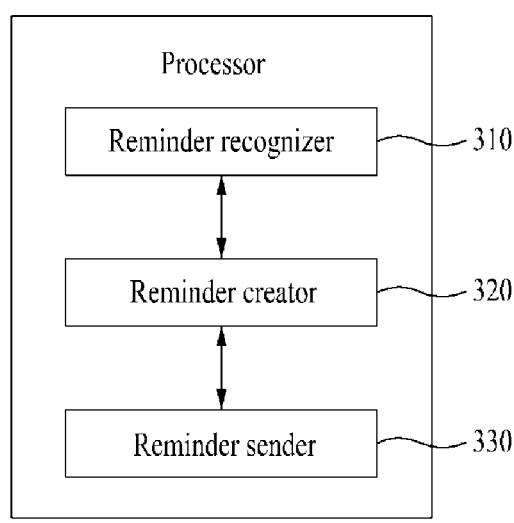
FIG. 3 is a diagram illustrating an example of components includable in a processor of an electronic device according to at least one example embodiment.
Figure 4:
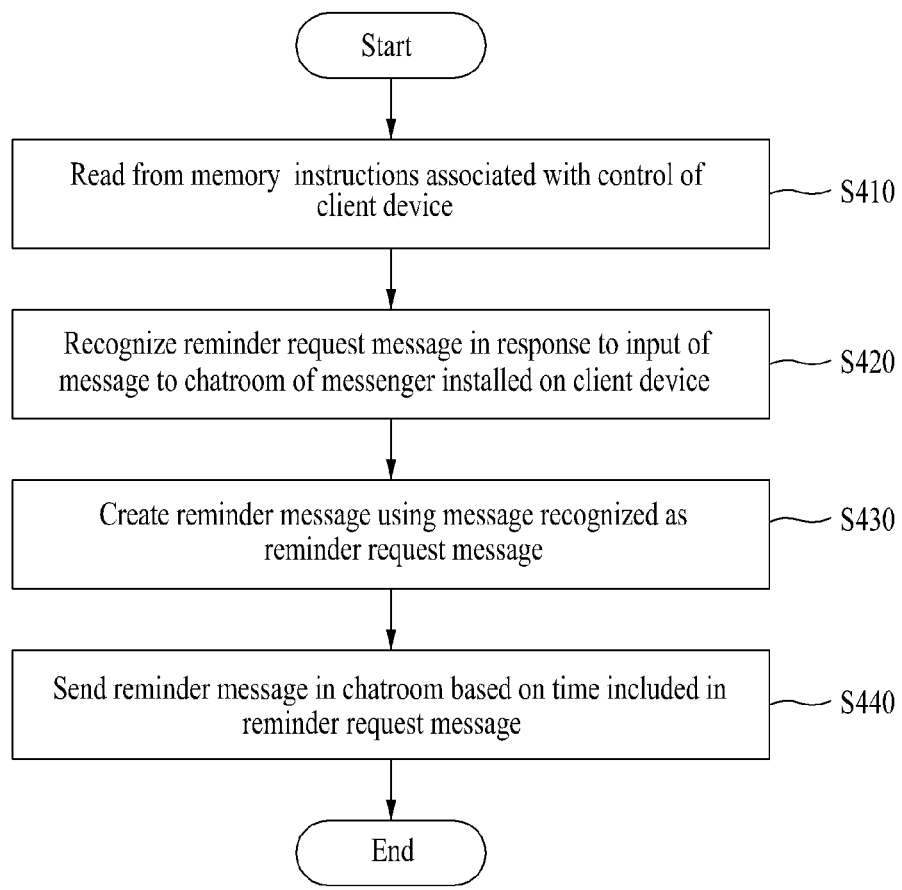
FIG. 4 is a flowchart illustrating an example of a method performed by an electronic device according to at least one example embodiment.

FIG. 3 is a diagram illustrating an example of components includable in a processor of an electronic device according to at least one example embodiment, and FIG. 4 is a flowchart illustrating an example of a method performed by an electronic device according to at least one example embodiment.

A reminder providing system implemented as a computer may be configured in the client device 210 according to the example embodiment. For example, the reminder providing system may be configured in a form of a program that independently operates or may be configured in an in-app form of a specific application to be operable on the specific application. Depending on example embodiments, the reminder providing system may provide a messaging service through interaction with the server 220, and/or the reminder providing system may be included in the server 220.

In response to an instruction provided from an application installed on the client device 210, the reminder providing system may perform the reminder providing method of FIG. 4.

Referring to FIG. 3, to perform the reminder providing method of FIG. 4, the processor 212 of the client device 210 may include a reminder recognizer 310, a reminder creator 320, and a reminder sender 330. Depending on example embodiments, components of the processor 212 may be included in or excluded from the processor 212. Also, depending on example embodiments, components of the processor 212 may be separated or merged for functional representation of the processor 212.

The processor 212 and the components of the processor 212 may control the client device 210 to perform operations S410 to S440 included in the reminder providing method of FIG. 4. For example, the processor 212 and the components of the processor 212 may be configured to execute an instruction according to a code of at least one program and a code of an OS included in the memory 211.

Here, the components of the processor 212 may be representations of different functions of the processor 212 performed by the processor 212 in response to an instruction (e.g., an instruction provided from an application executed on the client device 210) provided from a program code stored in the client device 210. For example, the reminder recognizer 310 may be used as a functional representation of the processor 212 to control the client device 210 to recognize a reminder request message in response to the instruction.

Referring to FIG. 4, in operation S410, the processor 212 may read from the memory 211 instructions associated with control of the client device 210. In particular, the read instruction may include an instruction for controlling the processor 212 to perform the following operations S420 to S440.

In operation S420, the reminder recognizer 310 may recognize a reminder request message in response to an input of a message sent from a user through a conversation interface, for example, a chatroom of a messenger installed on the client device 210. The reminder recognizer 310 may determine whether the message input from the user of the client device 210 through the chatroom is the reminder request message that needs to be reminded. The reminder recognizer 310 may determine whether the corresponding message is the reminder request message based on an input method or input content of the message. For example, if a preset event, such as a long tap, a long press, a touch and hold, a double tap, a long click, a double click, and the like, occurs on a specific message among messages input to the chatroom or messages sent from a user in the chatroom, the reminder recognizer 310 may recognize the specific message as the reminder request message. As another example, if a preset keyword or information about at least one of a time and a place is included in a message input to the chatroom, the reminder recognizer 310 may recognize the corresponding message as the reminder request message. Also, the reminder recognizer 310 may preset a list of keywords (e.g., a schedule, a meeting, a business trip, a birthday, a marriage, an anniversary, a celebration, an obituary, etc.) required to be reminded and, if a message including a preset keyword is input to the chatroom, may recognize the corresponding message as the reminder request message. In addition to such a list of keywords, if a message that includes a keyword (e.g., later, next time, tomorrow, next week, every month, n day (specific date), etc.) representing a future time or a keyword representing a place, such as a name of place a point of interest (POI) name, is input to the chatroom, the reminder recognizer 310 may recognize the corresponding message as the reminder request message.

The reminder recognizer 310 may group a plurality of messages consecutively input within a predetermined (or, alternatively, desired) period of time among messages input to the chatroom and may recognize the grouped plurality of messages as the reminder request message. For example, the reminder recognizer 310 may recognize, as a common reminder request message, a message input within a predetermined (or, alternatively, desired) period of time among previous and/or subsequent messages based on a message that includes a preset keyword or information about at least one of a time and a place.

The reminder recognizer 310 may process a message recognized as the reminder request message among messages included in the chatroom as a reminder message type that is a separate message type and may display the processed message to be distinguished from other messages of different message types in the corresponding chatroom. Here, the other messages of the different message types may include a message having a message type different from the reminder message type. If only the reminder message type is defined, a message of which a message type is not set may be referred to as a message of a different message type. For example, the reminder recognizer 310 may display an icon representing a corresponding reminder request message with respect to each of the reminder request messages included in the chatroom. If a message input from the user of the client device 210 is recognized as a reminder request message in the chatroom, the reminder recognizer 310 may forward the message of the reminder message type to the server 220 such that all of the users included in the chatroom may verify the message as the reminder request message.

In response to a request from the user of the client device 210, the reminder recognizer 310 may provide a reminder management screen for verifying messages recognized as the reminder request message. In response to a selection on a message selected as the reminder request message among messages included in the chatroom or in response to a selection on a reminder management menu configured as a separate menu in the chatroom, the reminder recognizer 310 may provide the reminder management screen. Here, the reminder management screen may be provided as a layer screen or a separate interface screen on the chatroom. The reminder request messages may be sorted in a relay form of timeline and thereby displayed on the reminder management screen. The reminder management screen may include a function for setting or editing at least one of a time, a place, and a checklist that need to be reminded and a function for deleting a corresponding reminder request message with respect to each of the reminder request messages.

In operation S430, the reminder creator 320 may create a reminder message using a message recognized as the reminder request message with respect to each reminder request message. For example, the reminder creator 320 may create the message recognized as the reminder request message as the reminder message. As another example, the reminder creator 320 may create the reminder message by processing at least a portion of the message recognized as the reminder request message. For example, if a keyword representing a future time is included in the reminder request message, the reminder creator 320 may create the reminder message by deleting at least a portion of the keyword or by modifying the keyword based on a current point in time or a point in time at which a reminder message is to be sent.

The reminder creator 320 may create the reminder message in advance at a point in time at which the reminder request message is recognized or may create the reminder message at a previous point in time based on a time included in the reminder request message. Here, the time included in the reminder request message may refer to a time specified based on the keyword representing the future time included in the message when creating the message or a time set by the user.

Further, if a plurality of check items is included in the reminder request message, the reminder creator 320 may create a reminder message that includes a checklist. For example, the reminder creator 320 may create the checklist by recognizing a word that is an intended target as an item to be checked, aside from a keyword representing a time or a place in the reminder request message based on semantic analysis, pragmatic analysis, and morphological analysis according to natural language processing. If a keyword representing a place is included in the reminder request message, the reminder creator 320 may create the reminder message that includes map information associated with the corresponding place. That is, if the reminder request message is associated with a specific place, the reminder creator 320 may create map information that includes a snapshot of a map on which a location of the place is marked, an estimated time, and a map search link.

In operation S440, the reminder sender 330 may send the reminder message created based on the reminder request message in the chatroom in which the reminder request message is recognized. For example, the reminder sender 330 may send the reminder message at a time preset for the reminder request message. As another example, the reminder sender 330 may send the reminder message at a time that is preset based on a time specified by a keyword representing a future time included in a corresponding message when creating the reminder request message. A point in time at which the reminder message is to be sent may be determined as a default time and may be customized by the user for each reminder request message. For example, with respect to a reminder request message "Tomorrow is Cony's birthday" created at 9:21 AM on Apr. 1, 2019, a reminder message may be set on a following day (Apr. 2, 2019) and, here, the reminder message may be sent at 9:21 AM set as a default time or at 10:30 AM set by the user. As another example, in the case of a reminder request message including a specific place, the reminder sender 330 may determine a point in time at which the reminder message is to be sent based on an estimated time to reach the corresponding specific place based on a specific location, for example, a current location of the client device 210. For example, if an estimated time to reach a specific place is 1 hour, the reminder sender 330 may send the reminder message at least 1 hour earlier or at a time earlier than a default time (e.g., 3 minutes or 1 hour). Here, the reminder sender 330 may display the reminder message among messages included in the chatroom to be distinguished from other messages in the chatroom. For example, with respect to each reminder message included in the chatroom, the reminder sender 330 may display an icon representing a corresponding reminder message.

The reminder sender 330 may recommend content shareable through the corresponding chatroom at a point in time at which a desired period of time is elapsed after sending the reminder message to the chatroom. For example, the reminder sender 330 may recommend contents, such as photos, videos, etc., created during a desired period of time after sending a reminder message "Tomorrow is Cony's birthday" in the chatroom and here, may recommend sharing of the corresponding contents.

Figure 5:
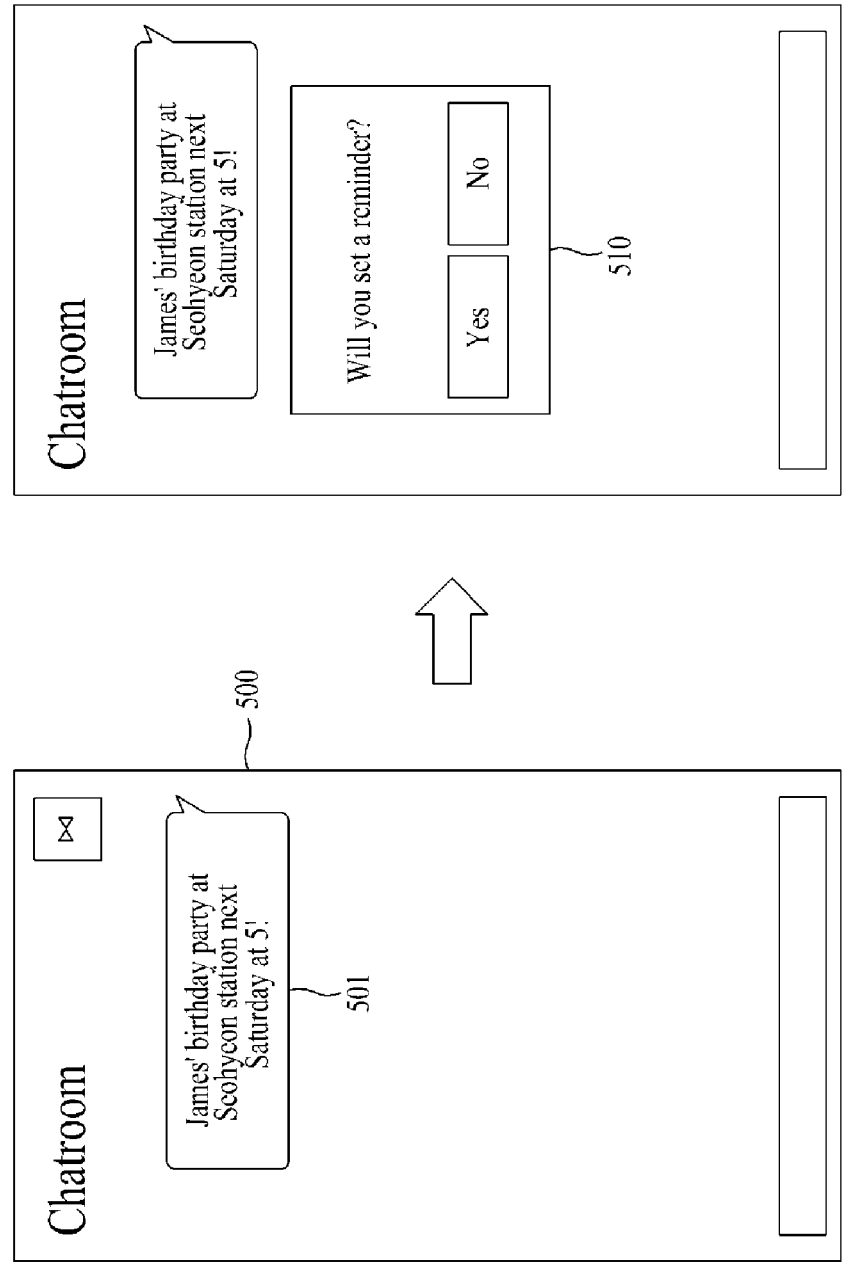
FIGS. 5, 6, and 7 illustrate examples of a process of recognizing a reminder request message according to at least one example embodiment.
Figure 6:
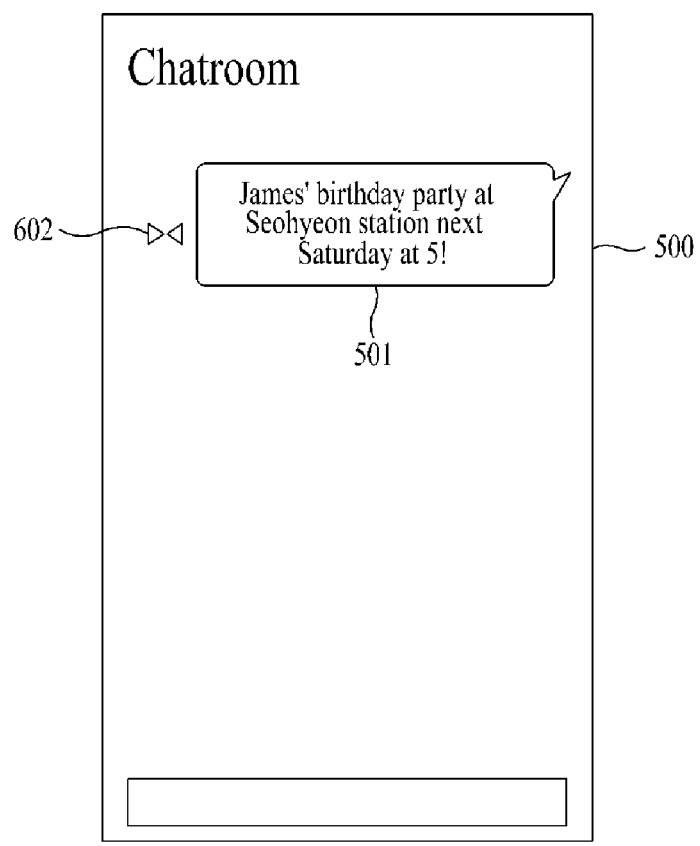
Figure 7:
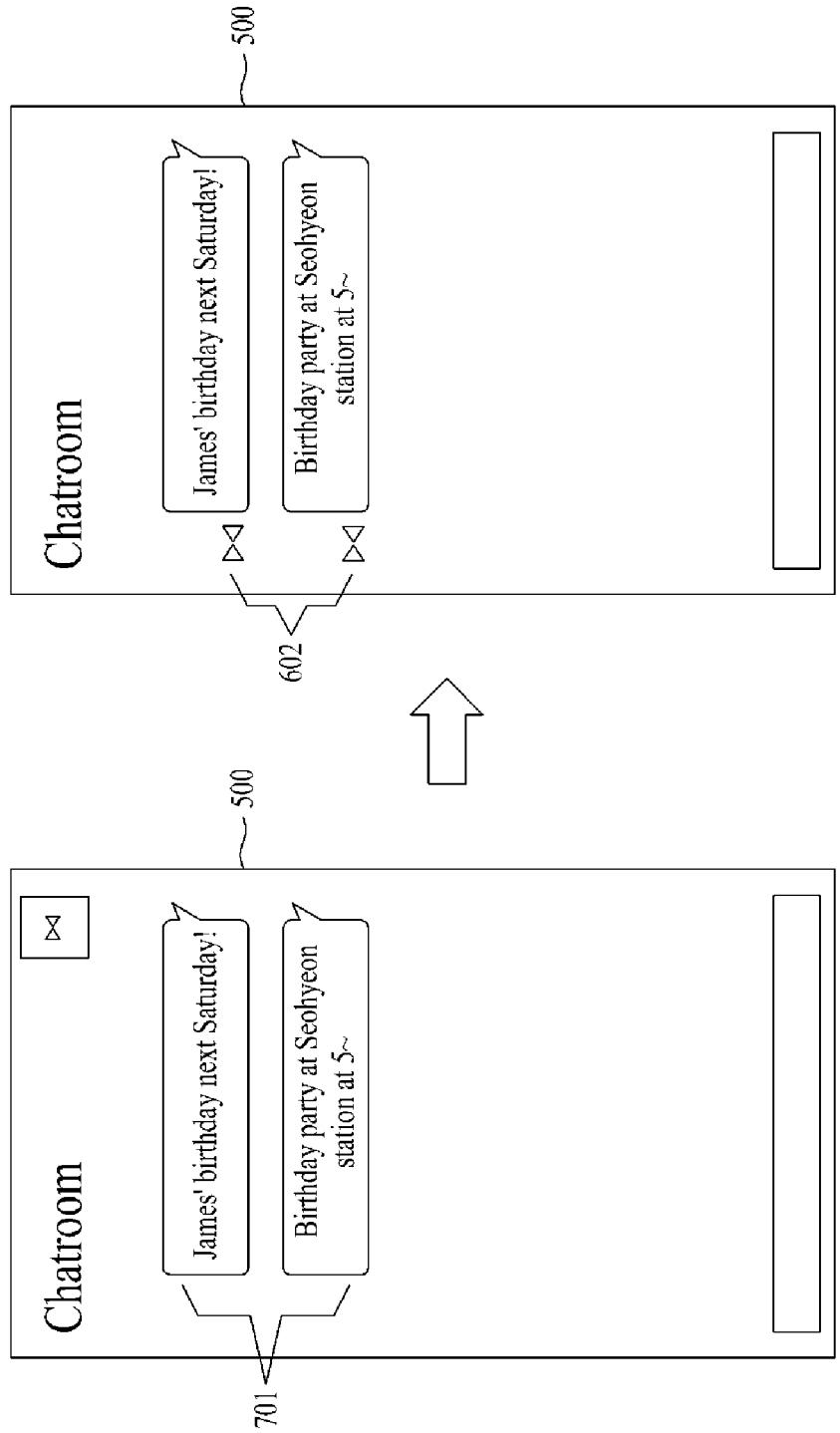

FIGS. 5, 6, and 7 illustrate examples of a process of recognizing a reminder request message according to at least one example embodiment.

Referring to FIG. 5, if an event preset as an event for a reminder request with respect to a message 501 input to a chatroom 500 occurs, the processor 212 may recognize the message 501 as a reminder request message. For example, when the message 501 is touched and held for a predetermined time or double-clicked, the processor 212 may recognize the message 501 as a reminder request message.

Also, if a preset keyword or information about at least one of a time and a place is included in the message 501 input to the chatroom 500, the processor 212 may recognize the message 501 as the reminder request message. Examples of the preset keyword may be any one or any combination of a word indicating a time, a word indicating a day, and a word indicating a place. For example, in response to an input of the message 501 "James' birthday party at Seohyeon station next Saturday at 5!," the processor 212 may recognize time information "next Saturday at 5," place information "Seohyeon station," and a keyword that need to be reminded "birthday," and accordingly, may recognize the message 501 as the reminder request message.

For example, in response to recognizing the message 501 input to the chatroom 500 as the reminder request message, the processor 212 may pop up a reminder setting screen 510 for receiving a verification regarding a reminder setting on the chatroom 500. If a reminder setting confirmation is input from the user through the reminder setting screen 510, the processor 212 may process the message 501 as the reminder request message.

As another example, in response to recognizing the message 501 input to the chatroom 500 as the reminder request message, the processor 212 may automatically process the corresponding message 501 as the reminder request message immediately without requesting the reminder setting confirmation of the user.

The processor 212 may process the message 501 recognized as the reminder request message as a reminder message type and may display the processed message 501 to be distinguished from other messages in the chatroom 500. For example, referring to FIG. 6, the processor 212 may display an icon (hereinafter, a reminder request icon 602) representing the reminder request message with respect to the message 501 recognized as the reminder request message.

The processor 212 may forward information about the message 501 recognized as the reminder request message to the server 220. The server 220 may process the reminder request message recognized in the chatroom 500 as a reminder message type that is a single message type and may forward the processed reminder request message to an electronic device, for example, the electronic devices 110, 120, 130, and/or 140, of counterpart(s) included in the chatroom 500 based on a message unit to which a unique number is assigned. Also, referring to FIG. 6, the processor 212 may display the message 501 recognized as the reminder request message in the chatroom 500 as the reminder message type in the chatroom 500 using the reminder request icon 602.

Depending on example embodiments, referring to FIG. 7, the processor 212 may recognize a plurality of messages 701 input to the chatroom 500 as a reminder request message. For example, in response to a consecutive input of the messages 701 "James' birthday next Saturday!" and "Birthday party at Seohyeon station at 5!," the processor 212 may recognize the messages 701 as a common reminder request message and may process the messages 701 based on a message unit to which an interdependent unique number is assigned for a batch reminder. Here, the processor 212 may display the reminder request icons 602 with respect to all of the plurality of messages 701 recognized as the common reminder request message.

Therefore, in response to recognizing the message 701 input to the chatroom 500 as the reminder request message, the processor 212 may process the message 701 as the reminder message type that is a single message unit in the chatroom 500.

Figure 8:
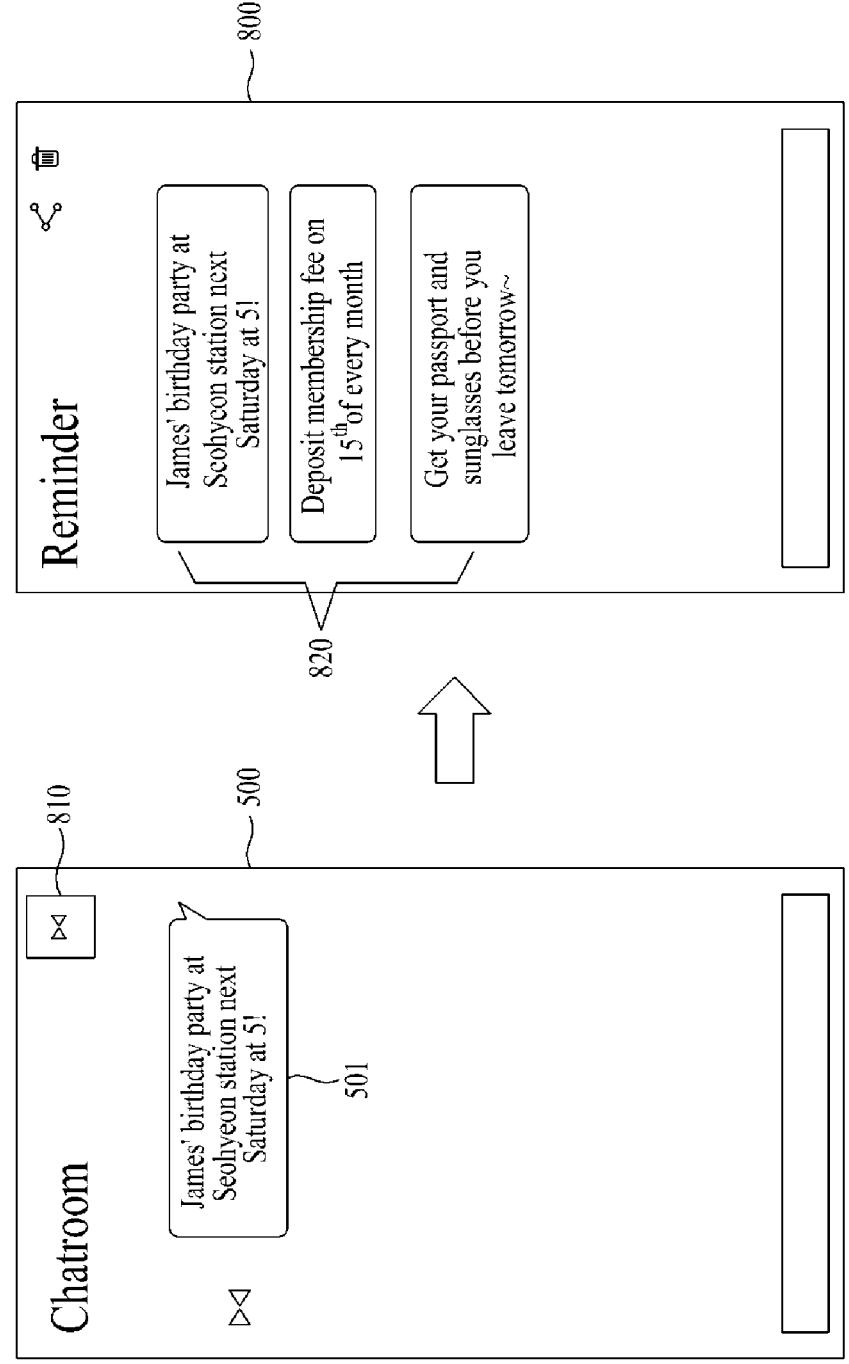
FIG. 8 illustrates an example of a reminder management screen according to at least one example embodiment.

FIG. 8 illustrates an example of a reminder management screen according to at least one example embodiment.

For example, the processor 212 may provide a reminder management screen 800 for verifying messages recognized as a reminder request message in the chatroom 500.

Referring to FIG. 8, the chatroom 500 may include a menu for reminder management, that is, a reminder management menu 810, as a menu in the chatroom 500. In response to a selection on the reminder management menu 810 or a selection on the message 501 recognized as the reminder request message in the chatroom 500, the processor 212 may provide the reminder management screen 800. The reminder management screen 800 may include a list of messages 820 recognized as the reminder request message among messages included in the chatroom 500, and may include a menu for selecting a request message, a menu for setting or editing at least one of a time, a place, and a checklist that need to be reminded, and a menu for deleting a corresponding reminder request message with respect to each reminder request message included in the list of messages 820. For example, while the menu for selecting a request message is activated, a user may be allowed to click or touch one or more messages that exist on the chatroom 500, to select the one or more messages as reminder request messages. While the menu for deleting a request message is activated, a user may be allowed to click or touch one or more of the reminder request messages to deselect the previously selected requested messages.

The user may verify messages corresponding to the reminder request message through the list of messages 820 on the reminder management screen 800 and may register or modify a reminder related setting with respect to each reminder request message and may also delete a message undesired to be reminded.

FIGS. 9, 10, 11, and 12 illustrate examples of a process of sending a reminder message according to at least one example embodiment.

The processor 212 may provide a reminder for a specific message by creating a reminder message based on a message of a reminder message type, that is, a message recognized as a reminder request message among messages included in the chatroom 500 and then sending the created reminder message in the chatroom 500.

Figure 9:
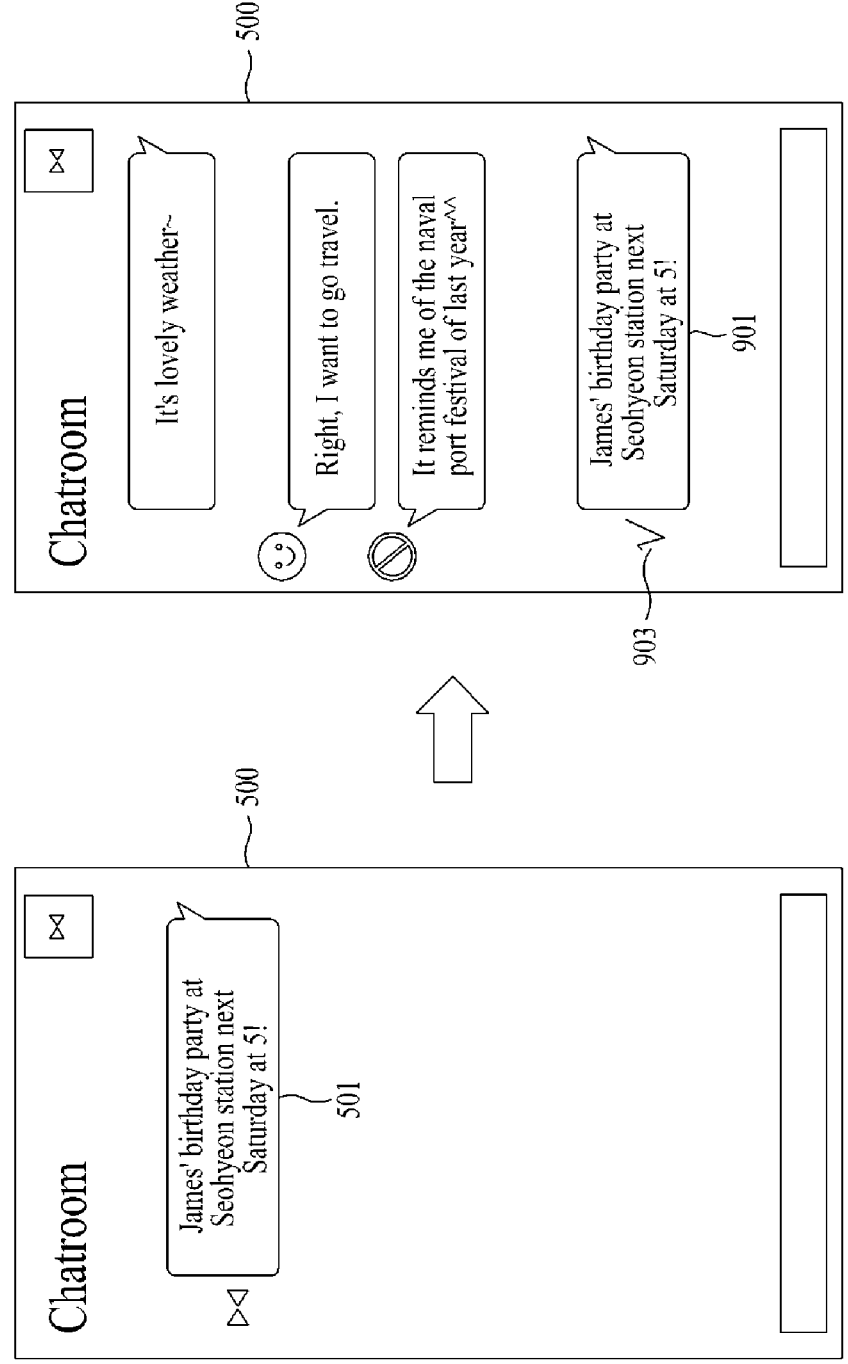
FIGS. 9, 10, 11, and 12 illustrate examples of a process of sending a reminder message according to at least one example embodiment.

Referring to FIG. 9, the processor 212 may send a reminder message 901 in the chatroom 500 at a reminder point in time preset for the message 501 of the reminder message type.

For example, the processor 212 may create and send the message 501 "James' birthday party at Seohyeon station next Saturday at 5!" of the reminder message type as the reminder message 901.

Figure 10:
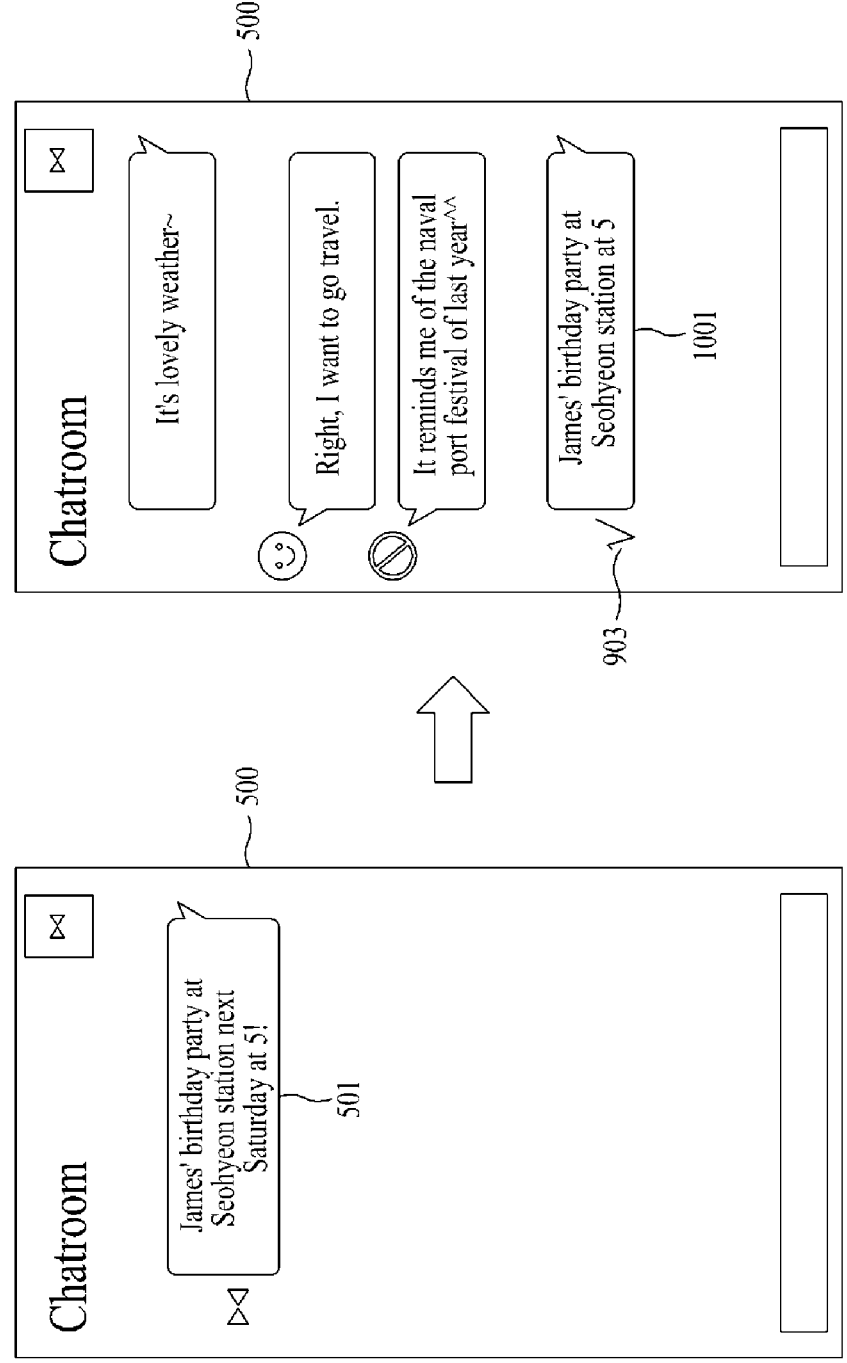

Depending on example embodiments, referring to FIG. 10, the processor 212 may delete a portion "next Saturday" of a keyword representing a time from the message 501 "James' birthday party at Seohyeon station next Saturday at 5!" of the reminder message type and may create and send only "James' birthday party at Seohyeon station at 5" as a reminder message 1001.

As another example, the processor 212 may modify a keyword "next Saturday" corresponding to a time concept to a keyword, for example, "today," of a current time in the message 501 "It's James' birthday party at Seohyeon station next Saturday at 5" of the reminder message type and may create "It's James' birthday party at Seohyeon station today at 5" as a reminder message.

That is, the processor 212 may send the message 501 of the reminder message type as is or may send a reminder message 1001 processed by deleting or modifying at least a portion of the message 501.

The processor 212 may displaying each of the reminder messages 901 and 1001 to be distinguished from other messages in the corresponding chatroom 500. For example, referring to FIGS. 9 and 10, the processor 212 may display an icon (hereinafter, referred to as a reminder icon 903) representing a corresponding reminder message with respect to each of the reminder messages 901 and 1001. Here, the reminder icon 903 may include an icon of a symbol different from that of the reminder request icon 602 representing the reminder request message. For example, the reminder icon 903 may include a word "reminder."

The reminder messages 901 and 1001 may be linked to corresponding original messages. When the reminder messages 901 and 101 are selected by a click, a double-click, a touch, a long touch, or a touch and hold, the chatroom 500 may be scrolled up to show the original messages which are to be reminded by the reminder messages 901 and 1001.

According to example embodiments of the present disclosure, the chatroom 500 may display the reminder icon 903 without sending or displaying the reminder messages 901 and 1001, and the reminder messages 910 and 1001 may be displayed in the chatroom 500 in response to the reminder icon 903 being selected, clicked, or touched by the counterpart. For example, when the reminder icon 903 is selected, clicked, or touched, the chatroom 500 may be scrolled up or down to show a message linked to the reminder icon 903. Accordingly, the counterpart of the conversation may be reminded at his or her desired time with a minimum interruption.

Figure 11:
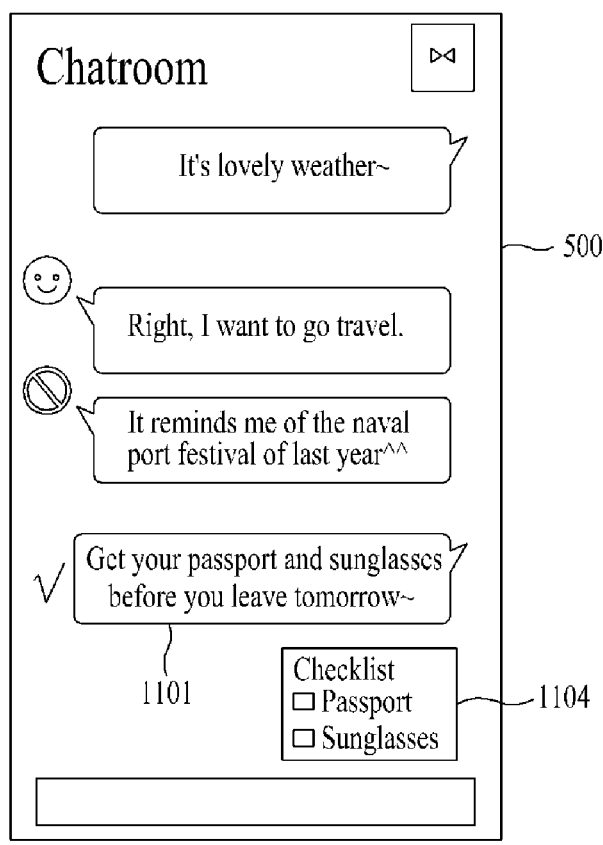

Further, referring to FIG. 11, the processor 212 may create a checklist 1104 with a reminder message 1101 based on a message of a reminder message type.

For example, the processor 212 may send the reminder message 1101 in the chatroom 500 at a reminder point in time preset for a reminder request message "Get your passport and sunglasses before you leave tomorrow." Here, the processor 212 may also send the checklist 1104 about check items included in the reminder request message.

Figure 12:
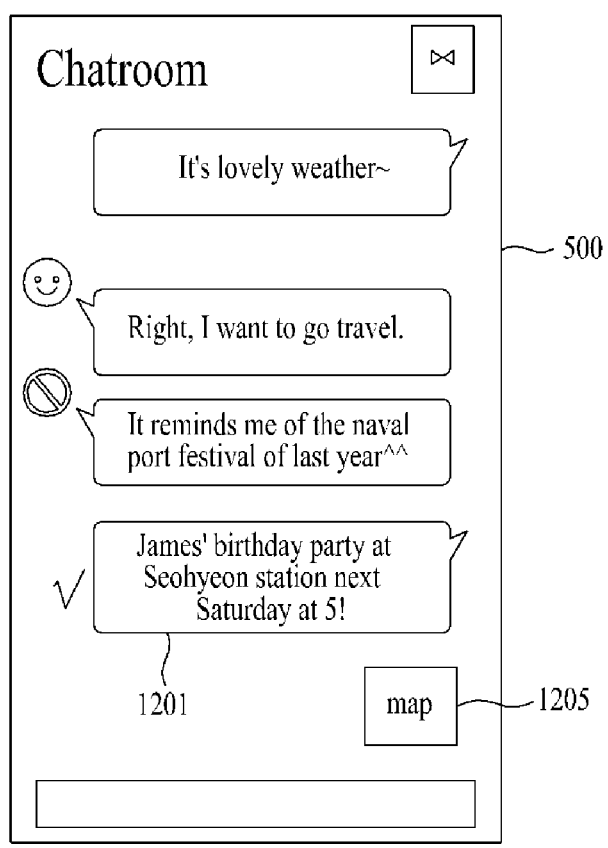

Also, referring to FIG. 12, if a keyword representing a place is included in a message of a reminder message type, the processor 212 may create map information 1205 associated with the place and may send the map information 1205 with a reminder message 1201.

For example, with respect to a reminder request message "James' birthday party at Seohyeon station next Saturday at 5!," the processor 212 may create the map information 1205 about "Seohyeon station" with the reminder message 1201. Here, the map information 1205 may include a map snapshot including a location of "Seohyeon station," an estimated time to reach "Seohyeon station," a map search link, and the like.

The processor 212 may recognize coordinates of a place included in the reminder request message using a resource on the client device 210 and may create the map information 1205 corresponding to the coordinates. As another example, when sending a message of a reminder message type to the sever 150, the processor 212 may also send a field value including the place and may acquire coordinates of the place from the server 220.

The processor 212 may push a notification indicating that a reminder message is received in the chatroom 500. For example, the processor 212 may apply a reception notification setting of the chatroom 500 with respect to the reminder message. As another example, the processor 212 may also push a notification indicating that the reminder message is received regardless of the reception notification setting of the chatroom 500.

Also, the processor 212 may send a reminder message with respect to a message of a reminder message type in the chatroom 500 and may provide a function of sharing at least one piece of content created after reminder in the chatroom 500. For example, the processor 212 may display a list of contents and may provide a sharing function to share photos or videos created on a reminder day or between 4:30 to 7:00 of a corresponding day after sending a reminder message "James' birthday party at Seohyeon station!" in the chatroom 500.

According to example embodiments, it is possible to create a reminder message based on a message input to a chatroom and to send the reminder message in the chatroom at a preset time The systems or the apparatuses described herein may be implemented using hardware components, software components, and/or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical equipment, computer record medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable record mediums.

The methods according to the example embodiments may be recorded in non-transitory computer-readable storage media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable storage media include magnetic media such as hard disks, floppy disks, and magnetic tape; optical media such as CD ROM disks and DVD; magneto-optical media such as floptical disks; and hardware devices that are specially to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be to act as one or more software modules in order to perform the operations of the above-described embodiments, or vice versa.

The foregoing embodiments are merely examples and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A reminder providing method implemented by a computer system comprising at least one processor configured to execute computer-readable instructions included in at least one memory, the reminder providing method comprising:
   recognizing, as a common reminder request message, a plurality of consecutive messages that are consecutively input into a chatroom;
   creating a reminder message based on the common reminder request message by assigning interdependent identifiers to the plurality of consecutive messages for a batch reminder; and
   sending the reminder message in the chatroom at a time preset for the common reminder request message.

2. The reminder providing method of claim 1, wherein the recognizing comprises recognizing the common reminder request message based on an occurrence of a preset event at a time of an input of the common reminder request message.

3. The reminder providing method of claim 1, wherein the recognizing comprises recognizing the common reminder request message based on a preset keyword being included in the common reminder request message.

4. The reminder providing method of claim 1, wherein the recognizing comprises recognizing the common reminder request message based on at least one of a time and a place being included in the common reminder request message.

5. The reminder providing method of claim 1, wherein the recognizing comprises:
   processing the common reminder request message based on a reminder message type of the common reminder request message; and
   displaying the reminder message to be distinguished from other messages of different message types from the reminder message type of the common reminder request message, in the chatroom.

6. A reminder providing method implemented by a computer system comprising at least one processor configured to execute computer-readable instructions included in at least one memory, the reminder providing method comprising:
   recognizing a reminder request message among one or more messages exchanged through a chatroom;
   creating a reminder message based on the reminder request message;
   sending the reminder message in the chatroom at a time preset for the reminder request message; and
   providing a reminder management screen to allow a user to confirm the recognized reminder request message as a message to be reminded to a counterpart of the user,
   wherein the reminder management screen comprises at least one of a list of messages recognized as the reminder request message, a menu for setting or modifying a reminder time for each of the reminder request messages included in the list of messages, and a menu for deleting at least one of the reminder request messages included in the list of messages.

7. The reminder providing method of claim 1, wherein the creating comprises creating the reminder message by processing at least a portion of the common reminder request message.

8. The reminder providing method of claim 1, wherein the creating comprises creating the reminder message by deleting or modifying at least a portion of a time-related keyword in the common reminder request message.

9. The reminder providing method of claim 1, wherein the creating comprises creating a checklist using a check item included in the common reminder request message by analyzing the common reminder request message, and
   the sending comprises providing the checklist and the reminder message through the chatroom.

10. A reminder providing method implemented by a computer system comprising at least one processor configured to execute computer-readable instructions included in at least one memory, the reminder providing method comprising:
   receiving a message including information of a time and a place;
   creating a reminder message and map information associated with the place, based on a keyword representing the place being included in the received message, and providing the map information and the reminder message at a time that is set based on the time indicated in the received message.

11. The reminder providing method of claim 1, wherein the sending comprises sending the reminder message in the chatroom at a time set as a default time or a time customized by a user based on time information included in the common reminder request message.

12. The reminder providing method of claim 1, wherein the sending comprises determining a point in time at which the reminder message is to be sent based on an estimated time to reach a place based on information about the place being included in the common reminder request message.

13. The reminder providing method of claim 1, further comprising:
displaying the reminder message to be distinguished from other messages in the chatroom.

14. The reminder providing method of claim 1, wherein the sending comprises outputting a notification indicating that the reminder message is received based on a notification setting of the chatroom.

15. The reminder providing method of claim 1, wherein the sending comprises outputting a notification indicating that the reminder message is received regardless of a notification setting of the chatroom.

16. The reminder providing method of claim 1, further comprising:
providing a share function for at least one piece of content created within a predetermined period of time when the predetermined period of time is elapsed since the common reminder request message is sent.

17. A non-transitory computer-readable recording medium storing computer instructions that, when executed by at least one processor, cause the at least one processor to perform a reminder providing method comprising:
recognizing, as a common reminder request message, a plurality of consecutive messages that are consecutively input into a chatroom;
creating a reminder message based on the common reminder request message by assigning interdependent identifiers to the plurality of consecutive messages for a batch reminder; and
sending the reminder message in the chatroom at a time preset for the common reminder request message.

18. A computer system comprising:
at least one memory configured to store computer-readable instructions; and
at least one processor configured to execute the computer-readable instructions to:
recognize, as a common reminder request message, a plurality of messages that are consecutively input into a chatroom;
create a reminder message based on the common reminder request message by assigning interdependent identifiers to the plurality of messages for a batch reminder; and
send the reminder message in the chatroom at a time preset for the common reminder request message.

19. A computer system comprising:
at least one memory storing computer-readable instructions; and
at least one processor configured to execute the computer-readable instructions to:
receive a message including information of a time and a place;
create a reminder message and map information associated with the place, based on a keyword representing the place being included in the received message; and
provide the map information and the reminder message at a time that is set based on the time indicated in the received message.

20. A non-transitory computer-readable recording medium having recorded thereon a program which, when executed by at least one processor of a computer, causes the at least one processor to execute a reminder providing method comprising:
receiving a message including information of a time and a place;
creating a reminder message and map information associated with the place, based on a keyword representing the place being included in the received message, and
providing the map information and the reminder message at a time that is set based on the time indicated in the received message.

* * * * *